US009952588B2

(12) United States Patent
Groth et al.

(10) Patent No.: US 9,952,588 B2
(45) Date of Patent: Apr. 24, 2018

(54) COMPUTERISED CONTROL DEVICE AND COMPUTER-IMPLEMENTED METHOD FOR CONTROLLING A PRODUCT PROCESSING PLANT, AND COMPUTER PROGRAM PRODUCT

(71) Applicant: Ferag AG, Hinwil (CH)

(72) Inventors: Uwe Groth, Wernetshausen (CH); Maurizio Corvo, Uster (CH)

(73) Assignee: FERAG AG, Hinwil (CH)

( * ) Notice: Subject to any disclaimer, the term of this patent is extended or adjusted under 35 U.S.C. 154(b) by 773 days.

(21) Appl. No.: 14/349,998

(22) PCT Filed: Sep. 27, 2012

(86) PCT No.: PCT/CH2012/000223
§ 371 (c)(1),
(2) Date: Apr. 4, 2014

(87) PCT Pub. No.: WO2013/049945
PCT Pub. Date: Apr. 11, 2013

(65) Prior Publication Data
US 2014/0244015 A1 Aug. 28, 2014

(30) Foreign Application Priority Data
Oct. 6, 2011 (CH) ...................................... 1637/11

(51) Int. Cl.
*G06F 7/00* (2006.01)
*G05B 19/418* (2006.01)
(Continued)

(52) U.S. Cl.
CPC ......... *G05B 19/4189* (2013.01); *B65G 43/00* (2013.01); *B65H 29/003* (2013.01);
(Continued)

(58) Field of Classification Search
CPC .................................................. G05B 19/4189
(Continued)

(56) References Cited

U.S. PATENT DOCUMENTS 3,917,252 A 11/1975 Harder et al.
4,552,349 A 11/1985 Loos et al.
(Continued)

FOREIGN PATENT DOCUMENTS

CN 1556486 A 12/2004
CN 101152668 A 4/2008
(Continued)

OTHER PUBLICATIONS

English translation of Office Action issued in Chinese Patent Application No. 201280049183.5, dated Jul. 3, 2015.
(Continued)

*Primary Examiner* — James D. Rutten
(74) *Attorney, Agent, or Firm* — Knobbe, Martens, Olson & Bear LLP

(57) ABSTRACT

A production configuration is determined for controlling a product processing plant that comprises a collecting system having a conveyor and a plurality of feeders for preparing product collections from products supplied by the feeders. The production configuration defines a production of a plurality of production sequences for a plurality of delivery routes, wherein each delivery route is assigned one or more production sequences, each of which define a production of a plurality of production collections of a collection type comprising a plurality of products. For each feeder an occupancy with products, which are to be conveyed by the feeder to the conveyor for preparation for the product collections, is determined. A production optimization parameter determines whether a defined production order is to be maintained for the delivery routes or whether the
(Continued)

production order of the delivery routes can be altered. If the production order can be altered, the production sequences of a plurality of delivery routes for the production of production collections of the same collection type are combined to a cohesive production sequence and the occupancy of the feeders is determined for the production order with combined production sequences.

29 Claims, 7 Drawing Sheets

(51) Int. Cl.
*B65H 39/02* (2006.01)
*B65H 43/00* (2006.01)
*B65G 43/00* (2006.01)
*B65H 29/00* (2006.01)
*B65H 31/24* (2006.01)
*B65H 39/055* (2006.01)
*B65H 39/065* (2006.01)
*B65H 39/075* (2006.01)

(52) U.S. Cl.
CPC ............ *B65H 31/24* (2013.01); *B65H 39/02* (2013.01); *B65H 39/055* (2013.01); *B65H 39/065* (2013.01); *B65H 39/075* (2013.01); *B65H 43/00* (2013.01); *B65H 2301/4311* (2013.01); *B65H 2301/431711* (2013.01); *B65H 2301/4471* (2013.01); *B65H 2511/25* (2013.01); *B65H 2551/18* (2013.01); *B65H 2551/26* (2013.01)

(58) Field of Classification Search
USPC .......................................................... 700/97
See application file for complete search history.

(56) References Cited

U.S. PATENT DOCUMENTS

| | | | |
|---|---|---|---|
| 5,155,679 A * | 10/1992 | Jain | G05B 19/41865 700/101 |
| 5,171,005 A | 12/1992 | Manley et al. | |
| 5,280,895 A | 1/1994 | Meier | |
| 5,398,922 A * | 3/1995 | Malatesta | B07C 3/065 271/104 |
| 6,213,457 B1 * | 4/2001 | Schlough | B65H 39/043 270/52.14 |
| 6,304,795 B1 | 10/2001 | Reist | |
| 2004/0195078 A1 * | 10/2004 | Anderson | B65G 13/02 198/781.05 |
| 2006/0102531 A1 * | 5/2006 | Conard | B07C 3/00 209/584 |
| 2006/0150848 A1 * | 7/2006 | Deutsch | B41F 17/02 101/483 |
| 2008/0077266 A1 * | 3/2008 | Thierauf | G06Q 10/04 700/99 |
| 2010/0154612 A1 * | 6/2010 | Brown | B26D 5/32 83/468.7 |
| 2011/0257782 A1 | 10/2011 | Altwegg | |
| 2012/0310402 A1 | 12/2012 | Dürr | |

FOREIGN PATENT DOCUMENTS

| | | |
|---|---|---|
| EP | 1 338 542 A1 | 11/2004 |
| JP | H05193721 A | 8/1993 |
| JP | 2000-514736 A | 11/2000 |

OTHER PUBLICATIONS

International Preliminary Report on Patentability dated Apr. 8, 2014, International Application No. PCT/CH2012/000223.
International Search Report dated Jan. 8, 2013, International Application No. PCT/CH2012/000223.
Written Opinion of the International Searching Authority dated Jun. 4, 2014, International Application No. PCT/CH2012/000223.
Office Action issued in Japanese Patent Application No. 2014-533750, dated Mar. 1, 2016.

* cited by examiner

|    | f1 | f2 | f3 | f4 | f5 | f6 | f7 | f8 | f9 | f10 |     | fF |
|----|----|----|----|----|----|----|----|----|----|-----|-----|----|
| s1 | P1 | P2 |    | P4 |    |    | P8 |    | P10|     |     | Pn |
| s2 |    | P2 |    | P4 | P5 |    |    |    | P10|     |     | Pn |
| s2 | P1 | P2 |    |    |    | P7 |    |    | P10|     |     | Pn |
| s3 |    |    | P3 |    |    |    |    | P9 |    | P11 |     |    |
| s4 | P1 |    | P3 |    |    |    |    |    |    | P11 | ... |    |
| s5 |    |    |    |    | P6 |    |    | P9 |    |     |     | Pn |
| s6 |    | P2 |    | P4 | P6 | P7 |    |    |    |     |     |    |
| s7 | P1 |    | P3 |    | P5 |    |    | P9 | P11|     |     | Pn |
|    |    |    |    |    |    | ...|    |    |    |     |     |    |
| sM |    |    |    |    |    |    |    |    |    |     |     |    |

Fig.9

COMPUTERISED CONTROL DEVICE AND COMPUTER-IMPLEMENTED METHOD FOR CONTROLLING A PRODUCT PROCESSING PLANT, AND COMPUTER PROGRAM PRODUCT

This application is the U.S. National Phase under 35 U.S.C. § 371 of International Application No. PCT/CH2012/000223, filed Sep. 27, 2012, which claims priority to Swiss Application No. 1637/11, filed Oct. 6, 2011.

BACKGROUND

Field of the Invention

The present invention relates to a computerized control device and a computer-implemented method for controlling a product processing plant. The present invention relates in particular to a computerized control device and a computer-implemented method for controlling a product processing plant, in particular a print product processing plant, which comprises a collecting plant with a conveyor and a plurality of feeders for preparing product collections of flat products, in particular print products, supplied by the feeders.

Background Art

With the known collecting plants for collecting (in the broader sense) product collections of multiple products by combining, inserting or collecting (in the narrower sense), the various products from multiple feeders arranged serially are supplied sequentially to a conveyor, where they are combined, inserted or collected on respective collection carriers such as grippers, for example. In print product processing plants, the products comprise flat print products of differing thicknesses in particular, but also other flat products, such as data media or other newspaper inserts, for example. The product collections prepared from the products are supplied sequentially by the conveyor to one or more further processing plants, for example, for inserting, stretch wrapping, stapling, gluing, cutting and/or stacking. Typically a collecting plant equipped for collating products is designed with a rotating conveyor. A rotating conveyor permits the conveyance of products, product collections and/or collection carriers along a closed curve and/or path cyclically past the product supplying feeders. Certain products and/or product collections may thus run through several cycles on the revolving conveyor, so that they are fed several times into the process of collating before being transferred to a further processing plant. For shipment by truck or other transport vehicles, for example, the product collections are stacked to form packages at stacking stations and then are banded. Usually multiple production sequences are necessary for one type of collection for a delivery route. The feeders must be loaded manually with the products to be fed before and during production by operating personnel of the product processing plant. To do so, the products are typically brought to the feeders on pallets and are supplied in stacks or bundles from the pallet to the respective feeder by the operating personnel. In product processing plants having a larger number of feeders, for example, several dozen or more than a hundred, and production to be carried out on these feeders to prepare several different types of product collections from optionally an even larger number of different products to be supplied, for example, more than a hundred or several hundred different newspaper inserts, for multiple shipping routes, each having multiple product collections of different types of collection, the production time is lengthened substantially when new occupancy of feeders during production leads to production interruptions. These setup times for the feeders may contribute toward substantial delays in the intended shipment times.

SUMMARY

One object of the present invention is to propose a computer-implemented method for control of a product processing plant having a collecting plant, in particular a print product processing plant, which has eliminated at least a few of the disadvantages of the known systems. In particular, one object of the present invention is to propose a computerized control device and a computer-implemented method for controlling a product processing plant with a collecting plant, which will permit improved occupancy of feeders of the collecting plant to achieve a high net output of the product processing plant.

According to the invention, these goals are achieved by the elements of the independent claims. Additional advantageous embodiments are also derived from the dependent claims and the description.

The aforementioned goals are achieved by the present invention in particular in that a production configuration, which defines the production of a plurality of production sequences for a plurality of delivery routes is detected, wherein each delivery route is assigned one or more production sequences, each sequence defining production of a plurality of product collections of a type of collection comprising a plurality of products, such that occupancy by products which are to be supplied from the feeder to the conveyor to create the product collections is determined for the feeder; a production optimization parameter, which determines whether a defined production order is to be maintained for the delivery routes or whether the production sequence of the delivery routes can be varied is received; in the case of a variable production sequence, the production sequences of a plurality of delivery routes for the production of product collections of the same type of collection are combined to form a cohesive production sequence and the occupancy of the feeders is determined for the production order with combined production sequences.

In one embodiment, production optimization parameters are received, which determine that a defined production time is to be maintained for one or more of the delivery routes and that the production order for the remaining delivery routes of production can be varied. The production sequences of the variable delivery routes are combined into a cohesive production sequence for the production of product collections of the same type of collection, and the occupancy of the feeders is determined for the production order with some production sequences unchanged and with some production sequences combined.

In one embodiment, an expected period of time for the product change with feeders and/or an interruption in production in the collecting plant is determined when there is a change in the type of collection from a combined production sequence to the successive combined production sequence, and the order of the combined production sequences is determined so that the total amount of time expected to be required for the product change and the production interruption is as short as possible.

In one embodiment, the occupancy of the feeders for a defined production order is determined so that the products are each assigned to one of the feeders, wherein products belonging to a common type of collection are not assigned to the same feeder and products present in successive production sequences are not assigned to the same feeder, if possible.

In one embodiment, the occupancy of the feeder is determined for a defined production order, so that the products are each assigned to one of the feeders, wherein products belonging to a common type of collection are not assigned to the same feeder. For products present in successive production sequences, an expected period of time for a product change is determined for feeders and/or for the production interruption of the collecting plant and the occupancy of the feeders is determined, so that the total period of time expected for the product change and the production interruption is as short as possible.

In one embodiment, a production optimization parameter is received, indicating whether or not simultaneous occupancy of multiple feeders with the same product is allowed, and the occupancy of the feeders is determined by taking into account the possibility of simultaneous occupancy.

In one embodiment, a production optimization parameter is received, determining a number of loading stations which permit parallel loading for multiple delivery routes, and the occupancy of the feeders is determined by taking into account the number of loading stations.

In one embodiment, modified production conditions are detected during production and the occupancy of the feeder is determined during production, taking into account the altered production conditions.

In one embodiment, the number of required feeders is displayed on a user interface, altered production sequences are received, and the occupancy of the feeders is determined by taking into account the altered production sequences.

In addition to a computerized control device and a computer-implemented method for controlling a product processing plant, the present invention also relates to a computer program product, which comprises a grippable computer-readable memory medium with a stored computer code. The computer code is equipped to control one or more processes of the control device, so that the processes and/or the control device execute(s) a method for controlling a product processing plant, in particular a print product processing plant, which comprises a collecting plant having a conveyor and a plurality of feeders for preparing product collections from the flat flexible products of a variety of types supplied to the feeders. The control device detects a production configuration, which defines the production of multiple production sequences for multiple delivery routes, wherein one or more production sequences are assigned to each delivery route, each of them defining the production of multiple product collections of one type of collection comprising multiple products. The control device determines the occupancy by products that are to be supplied by the feeder to the conveyor to prepare the product collections for each feeder. The control device receives a production optimization parameter, which determines whether a defined production order is to be maintained for the delivery routes or whether the production order of the delivery routes can be altered. In the case of a variable production order, the control device combines the production sequences of multiple delivery routes for the production of product collections of the same type of collection to form a cohesive production sequence and determines the occupancy of the feeders for the production order with the combined production sequences.

BRIEF DESCRIPTION OF THE DRAWINGS

One embodiment of the present invention is described below on the basis of one example. The example of this embodiment is illustrated by the following accompanying figures:

FIG. 7 shows a table of a production order with an assignment of production sequences to delivery routes.

FIG. 8 shows a table of a production order with an assignment of production sequences to delivery routes, wherein production sequences for product collections of the same type of collection extending beyond the individual routes are combined for multiple routes.

FIG. 9 shows a table with an occupancy plan, which illustrates the occupancy of the feeders with different products for successive production sequences.

DETAILED DESCRIPTION

Figure 1:
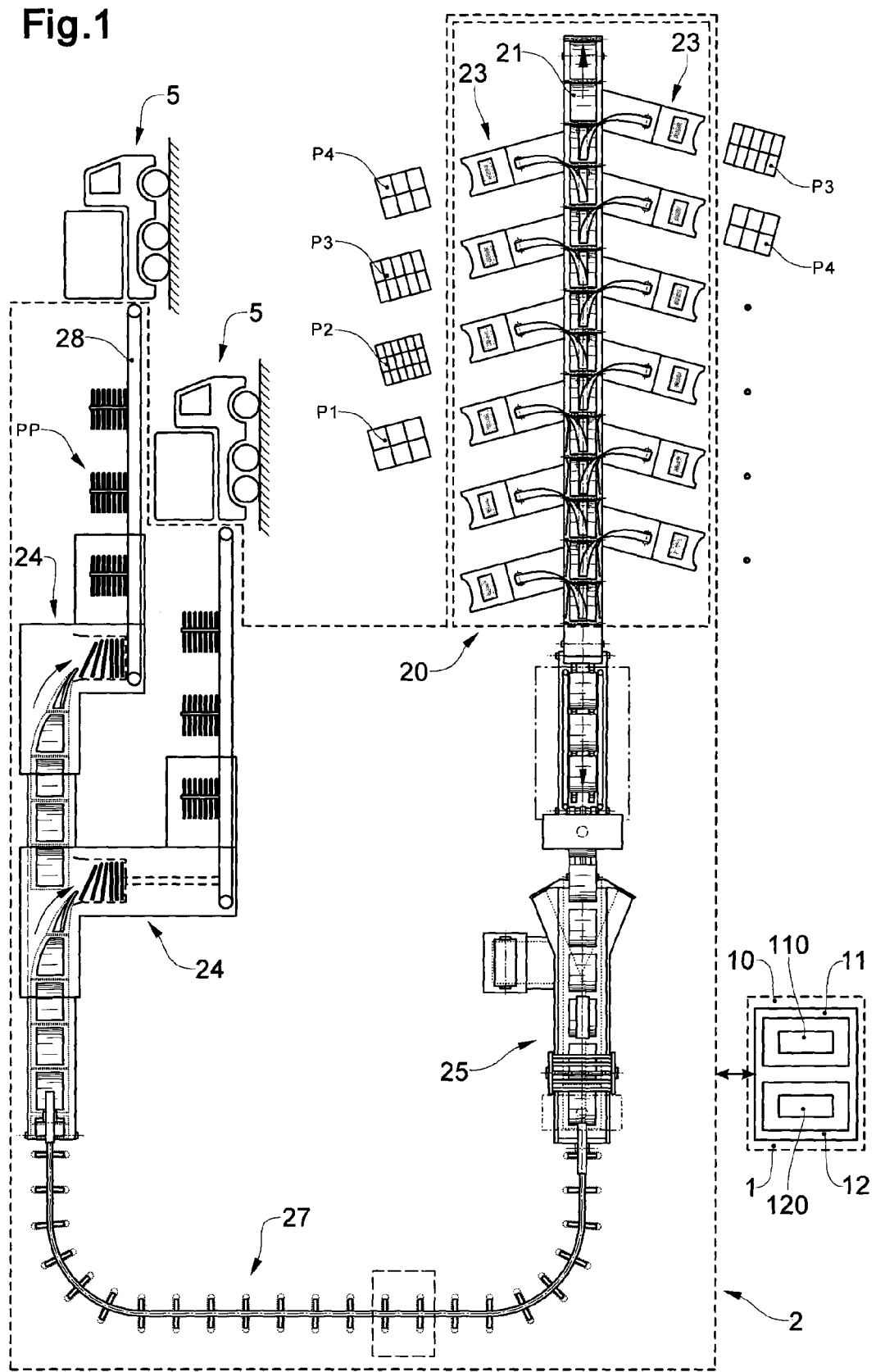
FIG. 1 shows a block diagram of a schematic drawing of a computer-controlled production processing plant, which comprises a collecting plant having a conveyor and multiple feeders for preparing product collections and multiple downstream stacking and loading stations.
Figure 2:
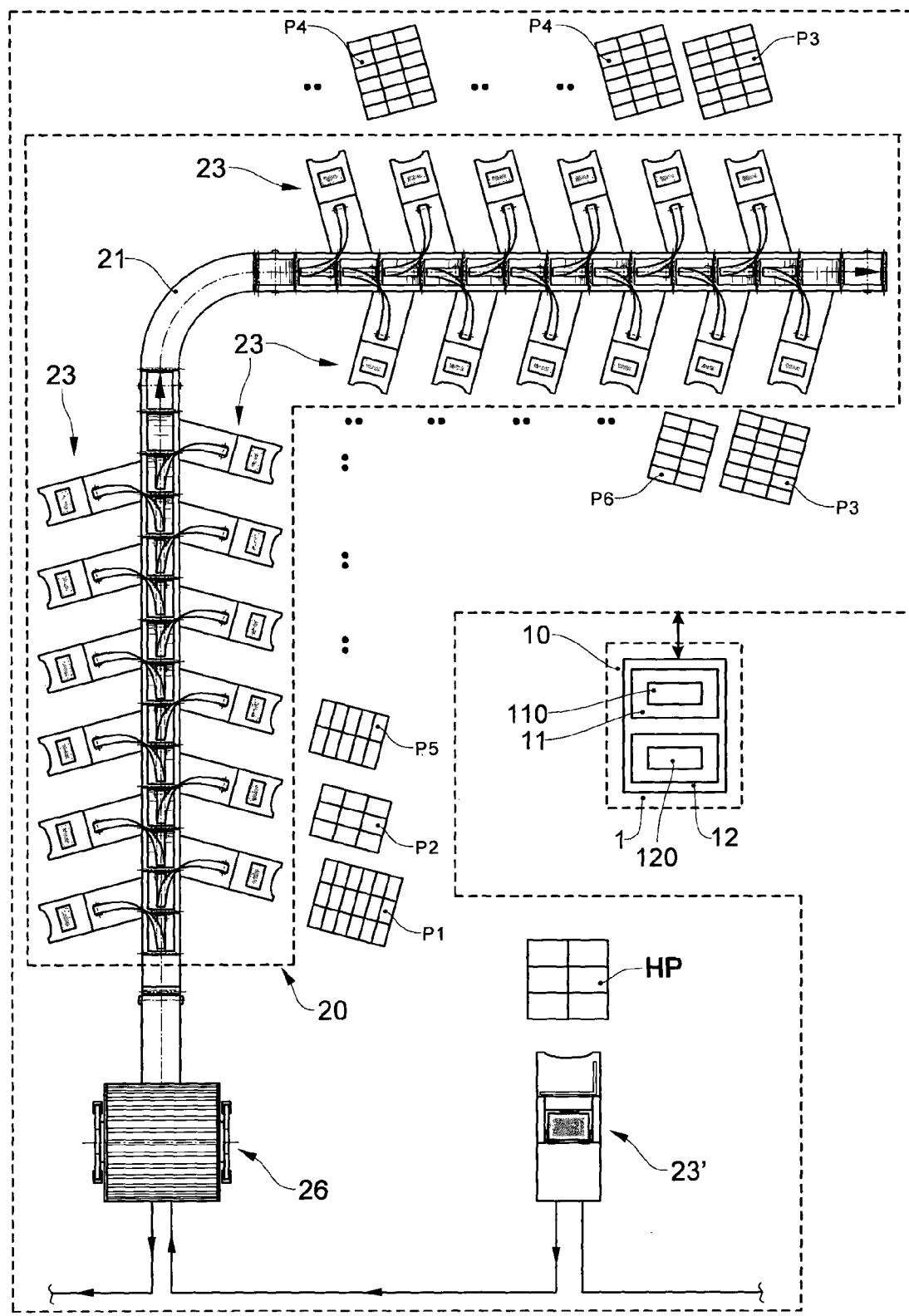
FIG. 2 shows a block diagram of a schematic drawing of an additional computer-controlled product processing plant, which comprises a collecting plant having a conveyor and multiple feeders for preparing product collections.

FIGS. 1 and 2 show a computer-controlled product processing plant as reference numeral 2, having a collecting plant 20, in particular a print product processing plant. The collecting plant 20 comprises at least one conveyor 21 and a plurality of feeders 23, which supply different products P1, P2, P3, P4, P5, P6 (P1-P6) to the conveyor 21, regardless of their product occupancy. The products P1-P6 comprise print products and/or other flat flexible products, such as data media, e.g., CDs, DVDs, product samples, e.g., dehydrated soups or teabags, letters, packaged textiles, flexible advertisements, etc. The collecting plant 20 comprises, for example, several dozen or more than 100 feeders 23. Depending on the application, several feeders 23 are occupied by the same product (split mode), for example, in the case of products P3, P4 having a thickness, such that the manual assembly of an individual feeder 23 by the operating personnel of the product processing plant 2 would be too slow to cover the uninterrupted supply of products P1-P6 to the conveyor 21 through a single feeder 23 (uninterrupted production) or as backup to compensate for any downtime of feeders 23 (maximum production reliability). The number of different products P1-P6 to be supplied during production for the creation of various product collections is typically greater than the number of feeders 23 of the product processing plant 2.

In various embodiments, the collecting plant 20 is equipped to create compilations of products by collating, inserting or collecting products or by other product-combining operations, these compilations of products being referred to here as product collections and comprising accordingly a conveyor 21 with a compilation distance with revolving conveyor means, a collecting drum, a belt conveyor for compiling copy streams or a collecting zone, each with or without a collection carrier.

The examples of the collecting plants 20 illustrated in FIGS. 1 and 2 each include a conveyor 21 having multiple, serially arranged collection carriers, for example, grippers, sockets, pockets, compartments, cubicles, brackets or saddles, which are passed by the feeders 23 in cycles along a closed line and pick up the products P1-P6 supplied there. Due to the sequential supply of products P1-P6, a product collection is compiled on the conveyor 21, in particular in and/or on the collection carriers.

As diagrammed schematically in FIGS. 1 and 2, in various embodiments, the product processing plant 2 comprises one or more further processing plants downstream from the collecting plant 20, for example, by way of a transfer unit. Such further processing plants comprise, for example, one or more stacking stations 24, a packaging system 25, for example, a film insert system, a system 26 for inserting additional products P1-P6 or product collections into a main product HP from a corresponding feeder 23', for example, a rotating insertion drum, a system for stapling and/or cutting, a system for gluing and/or cutting and/or a system for printing or attaching additional information, for example, names and addresses.

The completely assembled and optionally further processed product collections are supplied to one of a plurality of stacking stations 24, for example, by way of an additional conveyor 27, for example, a chain conveyor with grippers, as illustrated in FIG. 1, for example, such that the stacking station prepares a package PP with a defined number of product collections and supplies it to a conveyor 28 leading away for removal, for example, a belt conveyor, which supplies the package for delivery to an assigned truck 5 according to a scheduled route, a delivery route. Instead of preparing packages PP, it is also possible to wind up the prepared product collections. In one variant, the conveyor 28 leading away is designed as a buffer, which serves as a temporary storage for product collections that are prepared, or other buffers and/or additional buffers are provided as temporary storage mechanisms between the product processing plant 2 and the truck 5 making the deliveries.

The product processing plant 2 includes a control computer 10 for control, which is connected via communication links to the various components and units of the product processing plant 2, in particular to the collecting plant 20, the conveyor 21, the feeders 23 supplying the products and any other further processing plants, controllable transfer units and/or wastepaper distribution centers, stacking stations 24, additional conveyors 27, 28 and various sensors, counters and actuators of the product processing plant 2.

The numeral 1 refers to a computerized control device, which is embodied as part of the control computer 10 or is executed on one or more separate computers connected to the control computer 10. The control device 1 is linked directly by communication links or indirectly via the control computer 10 to the components and units of the product processing plant 2, in particular to the supplying feeders 23. As diagrammed schematically in FIGS. 1 and 2, the control device 1 comprises multiple function modules, in particular a control module 11 and a production module 12 whose function will be described in detail later as well as data memories and/or program memories for storing occupancy data 110 and production configuration data 120.

The production configuration data 120 comprises plant configuration parameters, production optimization parameters and production configurations which define at least one production of multiple production sequences for—as a rule—multiple delivery routes.

The plant configuration parameters define plant-specific configurations of the product processing plant 2 for the production, for example, the number of ready-to-operate feeders 23, the production speed (e.g., 27,000 cycles per hour) and the expected/average period of time of a production interruption, for example, 1-5 minutes.

A production configuration comprises production-specific information such as the number of products P1-P6 (e.g., 60) to be used as inserts, the number of editions to be processed, i.e., the main products HP (e.g., 5), the number of delivery routes (e.g., 126), the total number of copies, i.e., product collections to be produced (e.g., 58,000) and the number of types of collections (e.g., 78). Product data that describes, for example, the format, i.e., the geometric dimensions, the alignment and the weight of the product and/or the type of product and also comprises product image data with the title image and/or image details is stored for the individual products P1-P6.

Figures 7, 8:
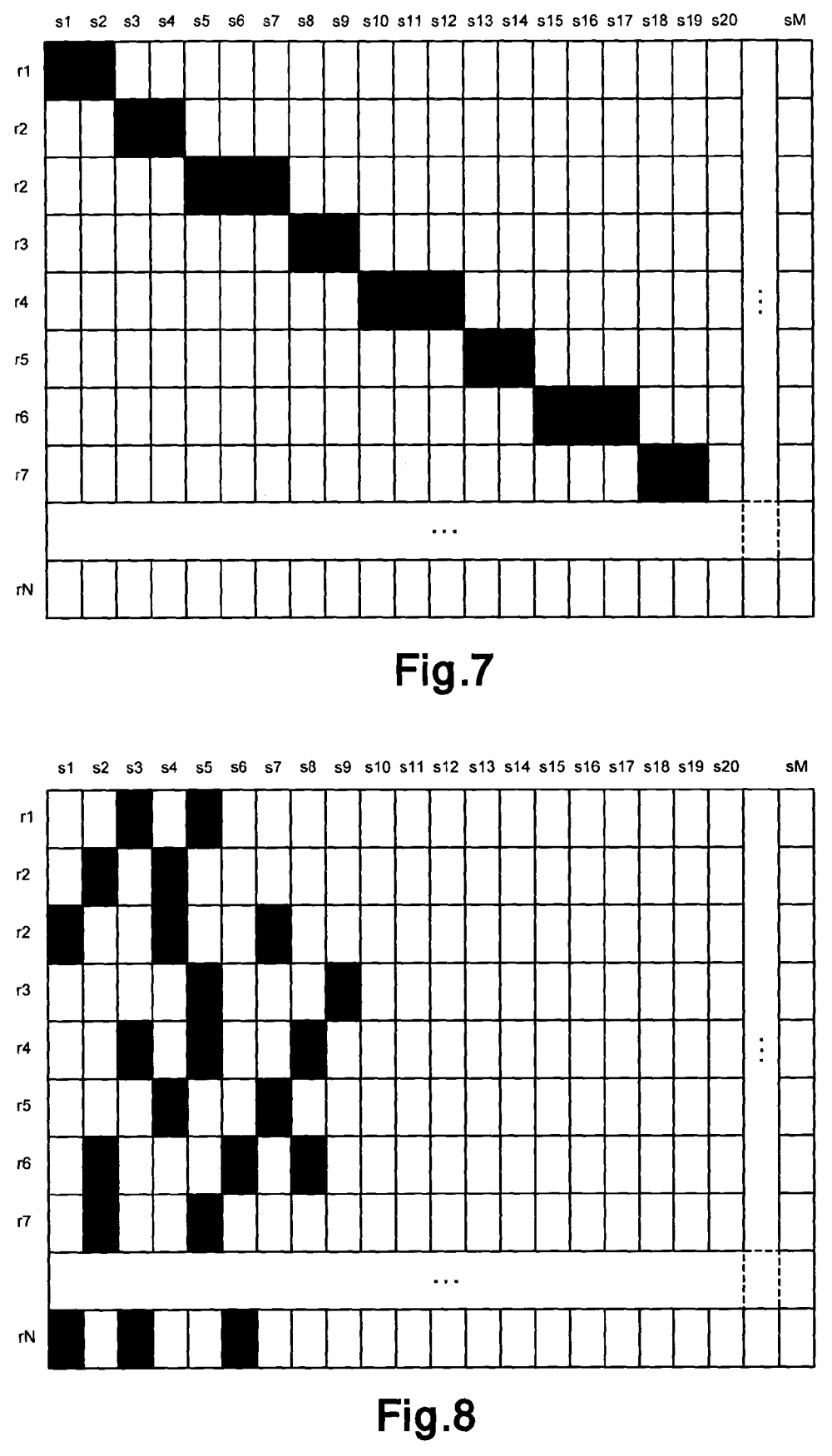

As illustrated in FIGS. 7 and 8 as an example, according to one production configuration, one or more production sequences $s1, s2, s3, s4, s5, s6, s7, s8, s9, s10, s11, s12, s13, s14, s15, s17, s18, s19, s20, sM$ (s1-sM) are assigned to each delivery route $r1, r2, r3, r4, r5, r6, r7, rN$ (r1-rN), wherein each production sequence s1-sM defines or creates a defined number of product collections of a certain type of collection. The type of collection of a product collection is determined by the products P1-P6, which are contained in the respective product collection, such that the order of the products P1-P6 in a product collection is fixedly defined or can be varied in a flexible manner, depending on the application. A production configuration has a defined production order of the product sequences. At least in the basic configuration of production as originally defined, the production order is defined so that the order of the production sequences, as illustrated in FIG. 7 as an example, is defined by the order of the delivery routes r1-rN, wherein a route-specific order is also determined for the order of the production sequences s1-sM of a delivery r1-rN. However, product collections of the same type of collection are typically delivered in not just one but actually in several different routes, so that given a route-defined production order, a significantly greater number of production sequences (e.g., 198) will be necessary than the number of different types of collections (e.g., 78) to be produced.

The production optimization parameters comprise a sequence consolidation parameter, a split operation parameter, a resorting parameter and a parallel loading parameter.

The sequence consolidation parameter indicates whether the route-dependent production order is to be maintained or whether it can be altered by the fact that production sequences for product collections of the same type of collection are combined in a higher-level cohesive sequence. Depending on the embodiment, the sequence consolidation parameter determines the flexibility of the production order for the entire production, e.g., production of one or more editions of a newspaper, or is limited to multiple successive delivery routes, wherein certain delivery routes must remain unchanged, for example, bound to a certain production time or delivery time.

The split operation parameter indicates whether or not split operation of the feeders 23 is allowed, i.e., whether or not multiple feeders 23 may be occupied by the same product P1-P6 at the same time.

The resorting parameter indicates whether or not a change in the order of the combined sequences of one type of collection is allowed, i.e., whether the order of the types of collections may be rearranged.

The parallel loading parameter indicates whether and, if so, how many parallel loading stations and/or stacking stations 24 are available at the same time.

As shown in FIG. 9 as an example, the occupancy data 110 for the individual production sequences s1-sM each define the occupancy of the feeders f1, f2, f3, f4, f5, f6, f8, f9, f10, fF (f1-fF) with the products P1, P2, P3, P4, P5, P6, P7, P8, P9, P10, P11, Pn (P1-Pn) of the respective type of collection. With a defined sequential order of the production sequences s1-sM, the occupancy data defines the chronological order t of the occupancy of the individual feeders 23, f1-fF. The marking line C in FIG. 9 shows a necessary change in the occupancy of the feeder f5, starting from the product P5 for the production sequence s2 to the product P6 for the production sequence s5. The marking line D in FIG. 9 shows a necessary change in the occupancy of the feeder f5, starting from the product P6 for the production sequence s6 to the product P5 for the production sequence s7, which takes place between directly successive production steps of the production sequence s6 and/or s7 and thus determines an interruption in operation.

The control device 1 and/or the control computer 10 is/are preferably connected to a higher-level computerized control system (not shown).

The function modules of the control device 1 and/or of the control computer 10, in particular the control module 11 and the production module 12, are preferably embodied as programmed software modules comprising computer program code for controlling one or more processors of one or more computers. The computer program code is stored on one or more computer-readable memory media that are fixedly or removably connected to the processors (accessible). However, those skilled in the art will understand that in alternative embodiments, the function modules may be implemented partially or completely by hardware complements.

The various functions, for the execution of which the function modules are equipped, are described in the following sections with reference to FIGS. 3 to 6, which illustrate flow charts with examples of sequences of possible steps for control of the product processing plant 2 with optimized occupancy of the feeders 23, f1-fF.

Figure 3:
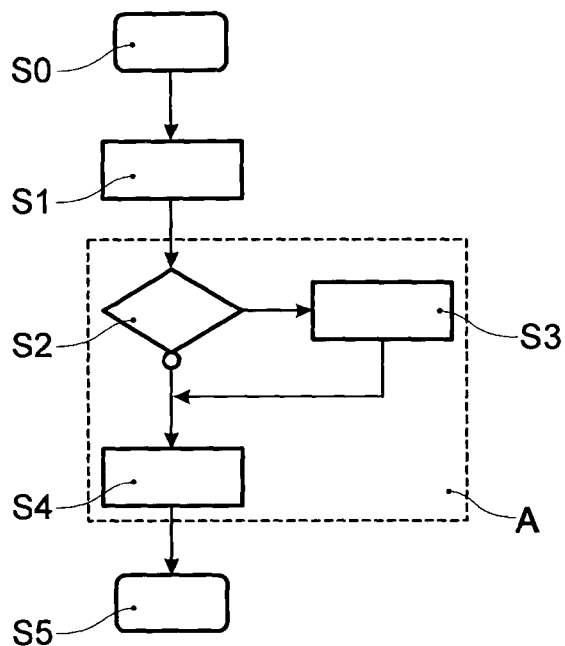
FIG. 3 shows a flow chart, which illustrates one example of a sequence of steps for controlling a product processing plant with an optimized occupancy of the feeders for preparing product collections.

As diagrammed schematically in FIG. 3, the production configuration data 120 is detected by production module 12 in the preparatory step S0. In doing so, the plant configuration parameters are received via a user interface and stored and/or defined and/or updated by the control computer by some current operating data and status data of the product processing plant 2, for example, with regard to the number of available and ready-to-use plant modules such as feeders 23, f1-fF or stacking stations 24. The production-specific data on the production configurations is received, for example, as data files by a computerized control system and/or input and/or adjusted via a user interface.

In step S1, production optimization parameters are detected by the control module 11.

Figure 4:
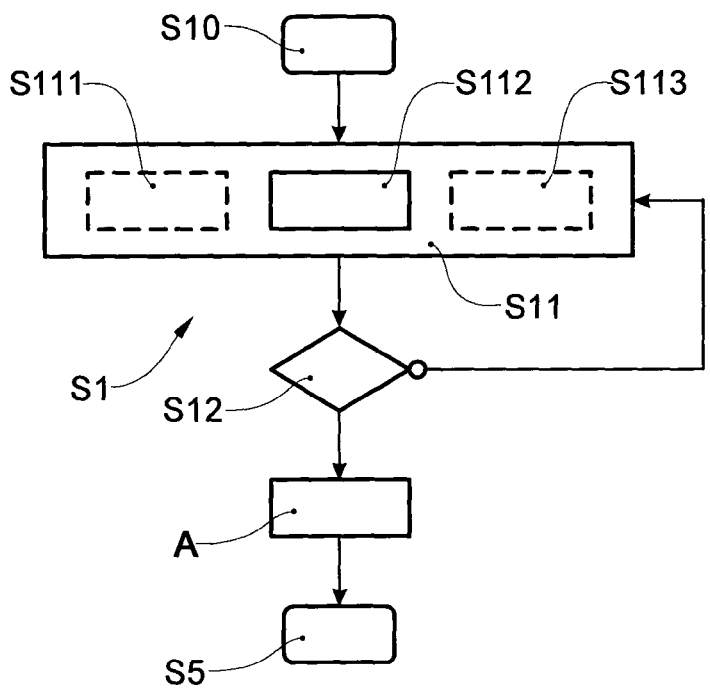
FIG. 4 shows a flow chart, which illustrates an example of a sequence of steps for controlling a product processing plant with occupancy of the feeders for preparing product collections that has been optimized according to production optimization parameters.

As diagrammed schematically in FIG. 4, in step S10, the control module 11 generates, on a display of the control device 1, a user interface by means of which the user can determine whether a defined production order is to be maintained for the delivery routes or whether the production order of the delivery routes can be varied. If the production order for the entire production can be varied, the user may set a corresponding sequence consolidation parameter by simple selection of an operating element provided for this purpose, such as a checkbox or a radio button. If the production order can be varied only for certain delivery routes, then the user sets sequence consolidation parameters for these delivery routes accordingly.

In step S11, the control module 11 receives additional production optimization parameters, depending on the sequence consolidation parameters that have been set. If the set sequence consolidation parameter indicates a production order that cannot be altered, only the split operating parameter can be set in step S112 via the user interface, indicating whether or not multiple feeders 23, f1-fF may be occupied by the same product P1-Pn at the same time. Otherwise, if the sequence consolidation parameters that have been set indicate a production order that can be altered, the resorting parameter and the parallel loading parameter can also be set via the user interface in steps S111 and/or S113 to select, on the one hand, whether the order of the types of collection can be rearranged and, on the other hand, to determine whether and, if so, how many parallel loading stations and/or stacking stations 24 are available at the same time, so that multiple delivery routes can be produced at the same time.

In step S12, the control module 11 activates the optimization block A when the user has terminated the input of the production optimization parameters via the interface. Otherwise, in step S11, the control module 11 receives additional production optimization parameters.

In step S5, the optimization block A is ended and the optimized production order according to FIG. 8 and/or the optimized occupancy of the feeders 23, f1-fF is/are displayed on the user interface according to FIG. 9. To do so, not only are the marking lines C, D shown with the new occupancy and interruptions, but instead, expected points in time and production times, in particular a detailed production schedule for all production sequences with the starting time and ending time as well as absolute and/or relative time information is/are given.

As shown in FIG. 3, the optimization block A of the control module 11 comprises a step S2 for checking on whether the sequence consolidation parameter displays a variable production order, a step S3 for optimizing the production order, if the production order can be varied, and a step S4 for optimizing the occupancy of the feeders 23, f1-fF with a defined (given and/or optimized) production order.

Figure 5:
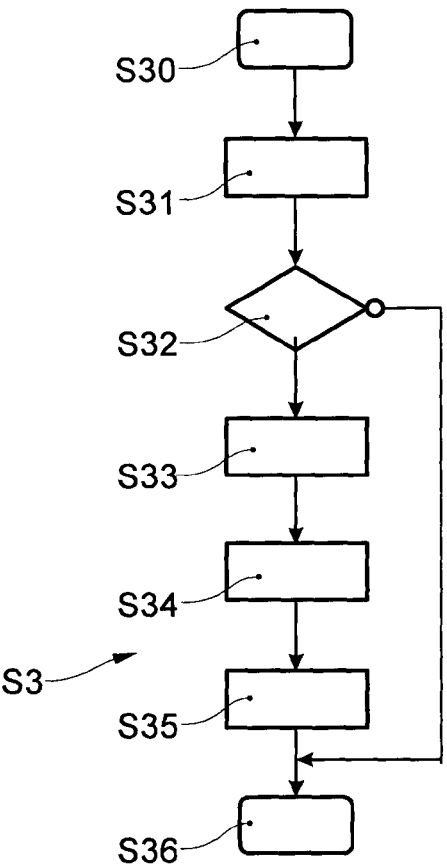
FIG. 5 shows a flow chart, which illustrates one example of a sequence of steps for controlling a product processing plant with an optimized production order of the production sequences.

FIG. 5 illustrates an example of a sequence of steps S30-S36, which are performed by the control module 11 for optimizing the production order in step S3.

In step S30, the control module 11 determines the types of collections of the various production sequences s1-sM, based on the initial fundamental production configuration, as illustrated in FIG. 7 as an example.

In step S31, the control module 11 combines the production sequences s1-sM into a consolidated common production sequence, such that all of them produce the same type of collection and therefore require a feed stream of the same products P1-Pn. As shown in FIG. 8 as an example, a combined production sequence s1-sM thus includes production sequences of the same type of collection, but they are produced for different delivery routes r1-rN.

In step S32, the control module 11 checks on whether the resorting parameter indicates a variable order of the types of collections and optionally proceeds in step S33, otherwise in step S36.

In step S33, the control module 11 determines the effort involved with all combinations of two successive types of collection of production, for example, the duration of time in changing from one of the two types of collection to the other type of collection by random change of occupancy of products P1-Pn on the same feeders 23, f1-fF. Types of collections having multiple products P1-Pn that are the same entail a low effort, whereas types of collections having many different products P1-Pn entail a high effort.

In step S34, the control module 11 determines an order of the types of collections which will entail the lowest possible total cost (short period of time). The search for an optimal order corresponds to the known "travelling salesman problem" wherein the object is to select an order for visiting several locations, such that the total travel distance of the travelling salesman is as short as possible. The skilled person will find many algorithms for solving this problem, for example, the "nearest neighbors" method, which offers a good compromise between accuracy and efficiency, or genetic algorithms, which have a very high accuracy but are slow. For the preparative optimization of the sorting order before the actual production, a method having a high accuracy is to be given preference over that. For optimization of the sorting order during production, a method with a high speed is to be given preference.

In step S35, the control module 11 saves the certain (preferred) order of the types of collections, and in step S36, it activates the optimization of the occupancy of the feeders 23, f1-fF according to step S4.

The product occupancy of feeders 23, f1-fF is optimized by various methods in step S4, depending on the embodiment. For example, the production steps are processed sequentially according to a so-called "greedy algorithm" and the products P1-Pn are newly assigned to the feeders 23 after each production step, so that only the past production steps are taken into account. In an alternative variant, the products P1-Pn are fixedly assigned to the feeders 23, f1-fF, avoiding production stops as much as possible. To do so, in a combinatory approach, assignments of products P1-Pn to feeders 23, f1-fF, which cause production interruptions, are not allowed, or in a so-called "clique approach," the effort involved with different assignments of products P1-Pn to feeders 23, f1-fF is calculated, and an occupancy with the lowest possible total cost (effort, time, downtime, setup time) is selected.

Figure 6:
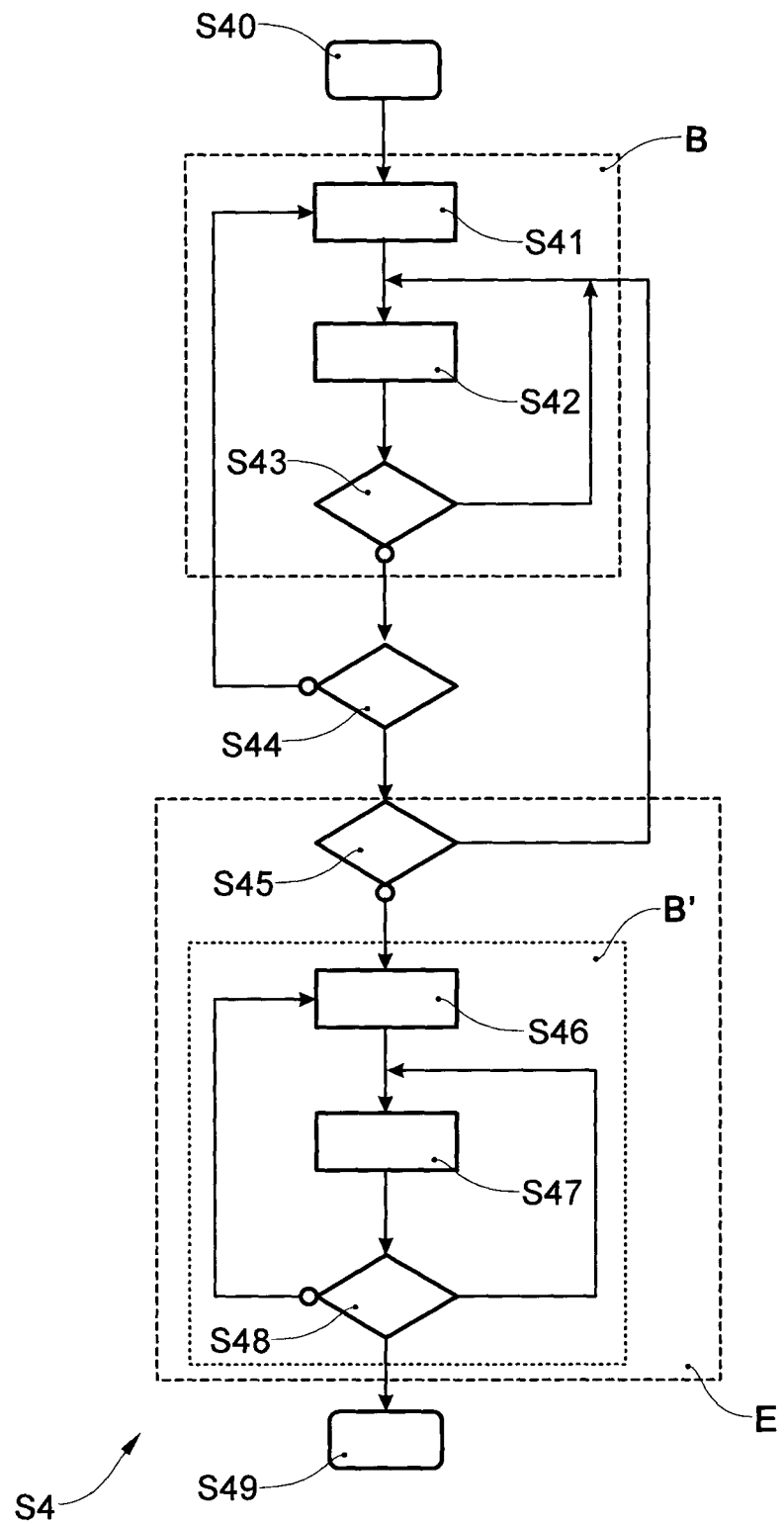
FIG. 6 shows a flow chart, which illustrates one example of a sequence of steps for controlling a product processing plant with an optimized occupancy of the feeders in a defined production order of the production sequences.

FIG. 6 illustrates an example of a sequence of steps S40-S49, which are performed by control module 11 to optimize the occupancy of the feeders 23, f1-fF in step S4 according to the combinatory approach, and in a variant according to the clique approach. The simultaneous occupancy of multiple feeders 23, f1-fF with the same product P1-Pn and/or the simultaneous production of product collections for multiple delivery route are approved or not, depending on the split operation parameter that has been set and the parallel loading parameter. Additional conditions, which can be applied restrictively in occupancy of the feeders 23, f1-fF with products P1-Pn comprise product data, in particular the product format (geometric dimensions, orientation), which rules out the possible occupancy of a feeder 23, f1-fF with an unsuitable product format, depending on the type of available feeder 23, f1-fF, or burdens it with effort and possible production interruptions because of necessary adjustments in the feeder 23, f1-fF during production.

In step S40, the control module 11 determines the various products P1-Pn that are needed for the production sequences s1-sM and/or types of collection of production.

In step S41, the control module 11 selects one of the products P1-Pn for assignment to one of the feeders 23, f1-fF. The products P1-Pn are sorted according to their number, for example, and are then selected in descending order.

In step S42, the control module 11 selects one of the feeders 23, f1-fF, to which the selected product P1-Pn is to be assigned.

In step S43, the control module 11 checks on whether a product P1-Pn, which occurs in a common type of collection has already been assigned to the selected feeder 23, f1-fF. If a product P1-Pn of a common type of collection has in fact been assigned to the selected feeder 23, then the control module 11 continues with the selection of an alternative feeder 23, f1-fF in step S42. This avoids assigning products P1-Pn of the same type of collection to the same feeder 23, f1-fF.

Otherwise, the control module 11 in step S44 checks on whether a product P1-Pn that is used in a production sequence carried out immediately before or after a production sequence in which the selected product P1-Pn is used has been assigned to the selected feeder 23, f1-fF. If the selected product and a product P1-Pn already assigned to the respective feeder 23, f1-fF occur in directly successive production sequences, the control module 11 continues in step S45. Otherwise, the control module 11 fixedly assigns the selected product P1-Pn to the selected feeder 23, f1-fF and stores the assignment in the occupancy data 110 in the occupancy plan.

In step S45, the control module 11 checks on whether additional feeders 23, f1-fF can still be selected for the assignment of the selected product P1-Pn and optionally continues with the selection of an alternative feeder 23, f1-fF in step S42. Otherwise, the occupancy optimization is terminated, and in step S46, the optimization block B' is started again without the restrictive condition of successive production sequences.

The optimization block B' corresponds essentially to block B. In step S46, the control module 11 selects one of the products P1-Pn for the assignment to one of the feeders 23, f1-fF according to step S41.

In step S47, the control module 11 selects one of the feeders 23, f1-fF to which the selected product P1-Pn is to be assigned according to step S42.

In step S48, the control module 11 checks on whether, according to step S43, a product P1 Pn, which occurs in a common type of collection, has already been assigned to the selected feeder 23, f1-fF. If a product P1-Pn of a common type of collection has in fact been assigned to the selected feeder 23, the control module 11 proceeds with the selection of an alternative feeder 23, f1-fF in step S47 according to step S42.

Otherwise, the control module 11 fixedly assigns the selected product P1-Pn to the selected feeder 23, f1-fF and stores the assignment in the occupancy data 110 in the occupancy plan.

In step S49, the control module 11 terminates the occupancy optimization.

In an alternative embodiment, the control module 11 carries out the optimization block E instead of step S45 and block B'.

In optimization block E, instead of the restrictive condition of successive production sequences, the cost incurred in allocating the selected product P1-Pn to the selected feeder 23, f1-fF is calculated. Based on that calculation, an occupancy of products P1-Pn is determined for feeders 23, f1-fF in such a way as to entail the least possible total cost ("weighted clique cover problem"). The cost is determined by the required new occupancies of feeders 23, f1-fF and the resulting delays and production interruptions (duration).

With a change in production conditions, i.e., with altered production configuration data 120, for example, when a change in the plant configuration is detected during production, for example, due to failure of a feeder 23, f1-fF or of a stacking station 24, with a change in the production configuration and/or a resulting change in the production optimization parameters, for example, in the event of a failure or delay of a truck 5 or in the event of a reduction in the available personnel for loading the feeders 23, f1-fF, there is a new determination and adjustment of the occupancy by performing an occupancy optimization during production, taking into account the product collections already created and/or the product collections yet to be created. The occupancy of the feeders 23, f1-fF is thus determined anew and optimized each time there is a change in production conditions, and this is done dynamically during ongoing production. The altered production conditions are automatically determined by the production module 12 and/or by the control computer 10, for example, on the basis of current operating data and status data of the product processing plant 2, or the altered production conditions are determined by way of a user interface.

Figure 10:
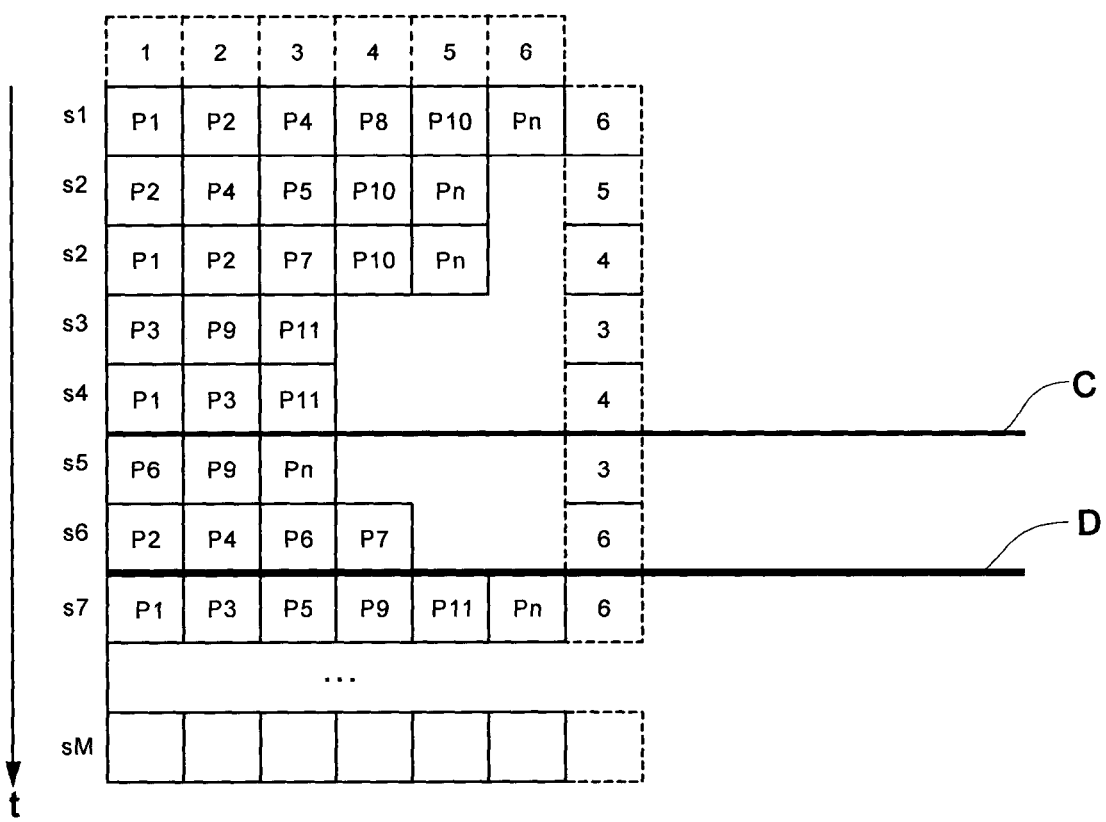
FIG. 10 shows a diagram with the number of feeders, which are required during a production sequence.

In one embodiment, a user detects by way of a user interface on the control computer 10 whether there has been a switch in the production sequences s1-sM. For example, the production module 12 is set up to display the number during a production sequence of the necessary feeders f1-fF, also to detect a switch in the production sequences s1-sM via the user interface. The control module 11 is set up accordingly to determine the occupancy of the feeders f1-fF, taking into account the altered production sequences. FIG. 10 shows a display of the number of feeders f1-fF required during a production sequence s1-sM (which is six feeders f1-fF, respectively, for the sequences s1, s2, s3, s4, s5, s6 and s7 6, 5, 4, 3, 4, 3, 6 in the example shown here).

A change in the production sequences s1-sM may be desirable on the basis of an evaluation of the display of the number of occupied feeders f1-fF shown on the user interface during a production sequence s1-sM. FIG. 10 shows the number of feeders necessary for performing the production specified according to FIG. 9. For example, one operating person is necessary for operation of one feeder f1-fF and one additional operating person is necessary for operating of the change in occupancy of a feeder f1-fF at the marking line C, and two additional operating persons are necessary for operation of the interruption in production. According to FIG. 10, it is thus possible to determine directly from the display how many operating persons are necessary for the respective production sequences s1-sM. The work schedule for the number of operating persons can be scheduled rapidly accordingly.

It may turn out to be unfavorable that it is necessary to switch from three operating persons to four operating persons for production sequences s3, s4, s5 and then to switch back to three operating persons. Thus, for example, the production sequence s4 may be switched to the production sequence s2, wherein a check is performed on the basis of the occupancy of the feeders f1-fF shown in FIG. 9 to ascertain whether such a change is allowed. This check may be performed manually, for example, or automatically, for example, by the control module 11.

In one embodiment, the diagram in FIG. 10 is used to change the production speed during the individual production sequence s1-sM. Thus, for example, the production sequence s2 may be concluded at 7:00 p.m. and the production itself may be prepared to be continued by three or four operating persons during a night shift, wherein the production sequence s6, which again requires a total of six operating persons at a normal production speed, would start at 4:00 a.m., for example. Each production sequence would take 3 hours, for example. In other words, the production sequence s3 would be concluded at 10:00 p.m. and the production sequence s4 would be concluded at 1:00 a.m. and the production sequence s5 would be concluded at 4:00 a.m. Therefore, because of the required night shift surcharge for operating persons, the number of operating persons can be kept low during the night shift for cost reasons, so the production speed is throttled by one-third at the start of production sequence s3, for example, and therefore the production sequence s3 is concluded at 11:00 p.m., the production sequence s4 is concluded at 3:00 a.m., and the production sequence s5 is concluded at 7:00 a.m. Thus, on the one hand, it is possible to minimize the number of operating persons during the night shift, while on the other hand, it is possible to shift the times when a larger number of operating persons are required, so it is not necessary to pay a night shift surcharge.

Similarly, according to the diagram in FIG. 10, it is easily possible to ascertain that an additional slowdown in the production speed in production sequence s4 may result in the same number of operating persons always being necessary during production sequence s3, production sequence s4 (during which a change in a feeder f1-fF is to be performed) and production sequence s5.

The altered production speed can be represented in FIG. 10 by a corresponding stretching of the time (broadening) of the respective production sequence s1-sM, so that it is possible to see directly on the timeline t how many operating persons are necessary at each point in time.

Similarly, it is possible to ascertain from the diagram according to FIG. 10, for example, when very small additional production sequences can be scheduled. For example, a production sequence s3' may be necessary but according to production sequence s3, this production sequence is also to be produced with a flyer in an edition of 2000 items. Such a production sequence could be placed after production sequence s3, for example, such that the production speed of the production sequence s3' would be reduced and altered, so that no additional operating persons are required, and furthermore, the production sequence s6 starts at a time when no night shift surcharge need be paid for the operating persons, for example.

Backup and split arrangements of the feeders may also have an influence on how many employees are needed to operate the production plant.

The production sequences s1-sM may also cover a period of a few minutes, for example, instead of a period of hours, as in the example above, depending on the number of products to be produced by the production plant.

In conclusion, it should be stated that, although computer program code has been allocated to specific functional modules in the description and the performance of steps has been depicted as being in a certain order, those skilled in the art will understand that the computer program code can be structured differently and that the order of at least certain steps can be altered without deviating from the scope of protection of the object.

What is claimed is:

1. A computerized control device for controlling a product processing plant, which comprises a collecting plant having a conveyor and a plurality of feeders for preparing product collections of flat products of various types supplied by the feeders, wherein the control device comprises one or more processors and a computer-readable memory having stored computer code, when executed, the computer code is configured to control the one or more processors so that the control device is configured to:
    detect a production configuration, which defines production of multiple production sequences for multiple delivery routes, wherein one or more production sequences are assigned to each delivery route and each production sequence defines the production of multiple product collections of a type of collection comprising multiple products;
    determine occupancy with products for the feeders, these products to be supplied from the feeder to the conveyor for preparing the product collections;
    receive a production optimization parameter, which determines whether a defined production order is to be maintained for the delivery routes or whether the production order of the delivery routes can be altered, and if the production order can be altered for multiple delivery routes;
    combine the production sequences for the production of product collections of the same type of collection, to form a cohesive production sequence; and
    determine the occupancy of the feeders for the production order with the combined production sequences such that the products are each assigned to one of the feeders, wherein the products which do not belong to a common type of collection are assigned to the same feeder, and products which are present in successive production sequences are not assigned to the same feeder, if possible.

2. The device according to claim 1 further comprising computer code executable by the one or more processors that further configures the control device to receive production optimization parameters which determine that a defined production time is to be maintained for one or more of the delivery routes and/or that the production order for the remaining delivery routes of the production can be altered and for the delivery routes of the variable production order, to combine the production sequences for the production of product collections of the same type of collection to form a cohesive production sequence and to determine the occupancy of the feeders for the production order with partially unaltered production sequences and partially combined production sequences.

3. The device according to claim 1, wherein the control device is configured to determine an expected period of time for a product change on feeders and/or a production interruption in the collecting plant when there is a change in the type of collection from a combined production sequence to a successive combined production sequence, such that the period of total time expected for the product change and the production interruption is as short as possible.

4. The device according to claim 1 further comprising computer code executable by the one or more processors that further configures the control device to receive a production optimization parameter indicating whether or not a simultaneous occupancy of multiple feeders with the same product is admissible and to determine the occupancy of the feeders, taking into account the possibility of simultaneous occupancy.

5. The device according to claim 1 further comprising computer code executable by the one or more processors that further configures the control device to receive a production optimization parameter, which determines a number of loading stations that permit parallel loading for multiple delivery routes and to determine the occupancy of the feeders, taking into account the number of loading stations.

6. The device according to claim 1 further comprising computer code executable by the one or more processors that further configures the control device to detect altered production conditions during production, and to determine the occupancy of the feeders during production, taking into account the altered production conditions.

7. The device according to claim 1 further comprising computer code executable by the one or more processors that further configures the control device to display the number of feeders required during a production sequence on a user interface and to detect a change in the production sequences by way of the user interface, and to determine the occupancy of the feeders, taking into account the altered production sequences.

8. A computer-implemented method for control of a product processing plant, which comprises a collecting plant with a conveyor and a plurality of feeders for preparing product collections of flat products of various types supplied by the feeders, comprising:
    detecting a production configuration, which defines production of multiple production sequences for multiple delivery routes, such that one or more production sequences are assigned to each delivery route, each production sequence defining the production of multiple product collections of a type of collection comprising multiple products;
    determining for the feeders an occupancy by products which are to be supplied by the feeder to the conveyor to prepare the product collections;
    receiving a production optimization parameter that determines whether a defined production order is to be maintained for the delivery routes or whether the production order of the delivery routes can be altered , and if the production order can be altered for multiple delivery routes;
    combining the production sequences of multiple delivery routes for the production of product collections of the same type of collection to form a cohesive production sequence; and
    determining the occupancy of the feeders for the production order with combined production sequences, wherein the products are each assigned to one of the feeders, such that the products which belong to a common type of collection are not assigned to the same feeder, and products that are present in successive production sequences are, if possible, not assigned to the same feeder.

9. The method according to claim 8, further comprising receiving production optimization parameters which determine that a defined production time is to be maintained for one or more of the delivery routes and/or that the production order for the remaining delivery routes of production can be altered, combining the production sequences of the delivery routes of the variable production order for the production of product collections of the same type of collection to form a cohesive production sequence and determining the occupancy of the feeders for the production order with some production sequences unaltered and some production sequences combined.

10. The method according to claim 8, further comprising determining of an expected period of time for a product change with feeders and/or a production interruption in the collecting plant expected with a change in the type of collection from a combined production sequence to a successive combined production sequence, and defining the order of the combined production sequences such that the total period of time expected for the product change and production interruption is as short as possible.

11. The method according to claim 8, further comprising receiving a production optimization parameter indicating whether or not simultaneous occupancy of multiple feeders with the same product is allowed and determining the occupancy of the feeders, taking into account the possibility of simultaneous occupancy.

12. The method according to claim 8, further comprising receiving a production optimization parameter, which determines a number of loading stations that permit parallel loading for multiple delivery routes, and determining the occupancy of the feeders, taking into account the number of loading stations.

13. The method according to claim 8, further comprising detecting altered production conditions during production and determining the occupancy of the feeders during production, taking into account the altered production conditions.

14. The method according to claim 8, further comprising displaying the number of required feeders on a user interface and detecting a change in the production sequences by way of the user interface, and determining the occupancy of the feeders, taking into account the changed production sequences.

15. A computer program product comprising an accessible non-transitory computer-readable memory medium having stored computer code, which is configured to control one or more processors of a control device for controlling a product processing plant, which comprises a collecting plant with a conveyor and multiple feeders for preparing product collections of flat products supplied by the feeders, so that the control device is configured to:
   detect a production configuration which defines the production of multiple production sequences for multiple delivery routes, such that one or more production sequences are assigned to each delivery route, each production sequence defining the production of multiple product collections of a type of collection comprising multiple products;
   determine an occupancy with products for the feeders, these products to be supplied from the feeder to the conveyor for preparing product collections;
   receive a production optimization parameter that determines whether a defined production order is to be maintained for the delivery routes or whether the production order of the delivery routes can be altered with a variable production order, and if the production order can be altered for multiple delivery routes;
   combine the production sequences of multiple delivery routes for the production of product collections of the same type of collection into a cohesive production sequence; and
   determine the occupancy of the feeders for the production order with combined production sequences.

16. A computerized control device for controlling a product processing plant, which comprises a collecting plant having a conveyor and a plurality of feeders for preparing product collections of flat products of various types supplied by the feeders, wherein the control device comprises one or more processors and a computer-readable memory having stored computer code, when executed, the computer code is configured to control the one or more processors so that the control device is configured to:
   detect a production configuration, which defines production of multiple production sequences for multiple delivery routes, wherein one or more production sequences are assigned to each delivery route and each production sequence defines the production of multiple product collections of a type of collection comprising multiple products;
   determine occupancy with products for the feeders, these products to be supplied from the feeder to the conveyor for preparing the product collections;
   receive a production optimization parameter, which determines whether a defined production order is to be maintained for the delivery routes or whether the production order of the delivery routes can be altered, and if the production order can be altered for multiple delivery routes;
   combine the production sequences for the production of product collections of the same type of collection, to form a cohesive production sequence; and
   determine the occupancy of the feeders for the production order with the combined production sequences such that the products are each assigned to one of the feeders, wherein the products which do not belong to a common type of collection are assigned to the same feeder for products that are present in successive production sequences, an expected period of time for the product change with feeders and/or an interruption in production of the collecting plants to be determined and the occupancy of the feeders is to be defined in such a way that the expected total period of time for the product change and the production interruption are as short as possible.

17. The device according to claim 16 further comprising computer code executable by the one or more processors that further configures the control device to receive production optimization parameters which determine that a defined production time is to be maintained for one or more of the delivery routes and/or that the production order for the remaining delivery routes of the production can be altered and for the delivery routes of the variable production order, to combine the production sequences for the production of product collections of the same type of collection to form a cohesive production sequence and to determine the occupancy of the feeders for the production order with partially unaltered production sequences and partially combined production sequences.

18. The device according to claim 16, wherein the control device is configured to determine an expected period of time for a product change on feeders and/or a production interruption in the collecting plant when there is a change in the type of collection from a combined production sequence to a successive combined production sequence, such that the period of total time expected for the product change and the production interruption is as short as possible.

19. The device according to claim 16 further comprising computer code executable by the one or more processors that further configures the control device to receive a production optimization parameter indicating whether or not a simultaneous occupancy of multiple feeders with the same product is admissible and to determine the occupancy of the feeders, taking into account the possibility of simultaneous occupancy.

20. The device according to claim 16 further comprising computer code executable by the one or more processors that further configures the control device to receive a production optimization parameter, which determines a number of loading stations that permit parallel loading for multiple delivery routes and to determine the occupancy of the feeders, taking into account the number of loading stations.

21. The device according to claim 16 further comprising computer code executable by the one or more processors that further configures the control device to detect altered production conditions during production, and to determine the occupancy of the feeders during production, taking into account the altered production conditions.

22. The device according to claim 16 further comprising computer code executable by the one or more processors that further configures the control device to display the number of feeders required during a production sequence on a user interface and to detect a change in the production sequences by way of the user interface, and to determine the occupancy of the feeders, taking into account the altered production sequences.

23. A computer-implemented method for control of a product processing plant, which comprises a collecting plant with a conveyor and a plurality of feeders for preparing product collections of flat products of various types supplied by the feeders, comprising:

detecting a production configuration, which defines production of multiple production sequences for multiple delivery routes, such that one or more production sequences are assigned to each delivery route, each production sequence defining the production of multiple product collections of a type of collection comprising multiple products;

determining for the feeders an occupancy by products which are to be supplied by the feeder to the conveyor to prepare the product collections;

receiving a production optimization parameter that determines whether a defined production order is to be maintained for the delivery routes or whether the production order of the delivery routes can be altered, and if the production order can be altered for multiple delivery routes;

combining the production sequences of multiple delivery routes for the production of product collections of the same type of collection to form a cohesive production sequence; and determining the occupancy of the feeders for the production order with combined production sequences, wherein the products are each assigned to one of the feeders, such that products that belong to a common type of collection are not assigned to the same feeder; for products that are present in successive production sequences, determining an expected period of time for a product change with feeders and/or a production interruption of the collecting plant and defining the occupancy of the feeders, such that the total period of time expected for a product change or a production interruption is as short as possible.

24. The method according to claim 23, further comprising receiving production optimization parameters which determine that a defined production time is to be maintained for one or more of the delivery routes and/or that the production order for the remaining delivery routes of production can be altered, combining the production sequences of the delivery routes of the variable production order for the production of product collections of the same type of collection to form a cohesive production sequence and determining the occupancy of the feeders for the production order with some production sequences unaltered and some production sequences combined.

25. The method according to claim 23, further comprising determining of an expected period of time for a product change with feeders and/or a production interruption in the collecting plant expected with a change in the type of collection from a combined production sequence to a successive combined production sequence, and defining the order of the combined production sequences such that the total period of time expected for the product change and production interruption is as short as possible.

26. The method according to claim 23, further comprising receiving a production optimization parameter indicating whether or not simultaneous occupancy of multiple feeders with the same product is allowed and determining the occupancy of the feeders, taking into account the possibility of simultaneous occupancy.

27. The method according to claim 23, further comprising receiving a production optimization parameter, which determines a number of loading stations that permit parallel loading for multiple delivery routes, and determining the occupancy of the feeders, taking into account the number of loading stations.

28. The method according to claim 23, further comprising detecting altered production conditions during production and determining the occupancy of the feeders during production, taking into account the altered production conditions.

29. The method according to claim 23, further comprising displaying the number of required feeders on a user interface and detecting a change in the production sequences by way of the user interface, and determining the occupancy of the feeders, taking into account the changed production sequences.

* * * * *

UNITED STATES PATENT AND TRADEMARK OFFICE
CERTIFICATE OF CORRECTION

PATENT NO. : 9,952,588 B2  
APPLICATION NO. : 14/349998  
DATED : April 24, 2018  
INVENTOR(S) : Uwe Groth et al.

Page 1 of 1

It is certified that error appears in the above-identified patent and that said Letters Patent is hereby corrected as shown below:

In the Specification

In Column 6, Line 30, change "s15, s17," to --s15, s16, s17,--

In Column 7, Line 14, change "f6, f8," to --f6, f7, f8--

Signed and Sealed this  
Ninth Day of April, 2019

Andrei Iancu  
*Director of the United States Patent and Trademark Office*